Figure 1:
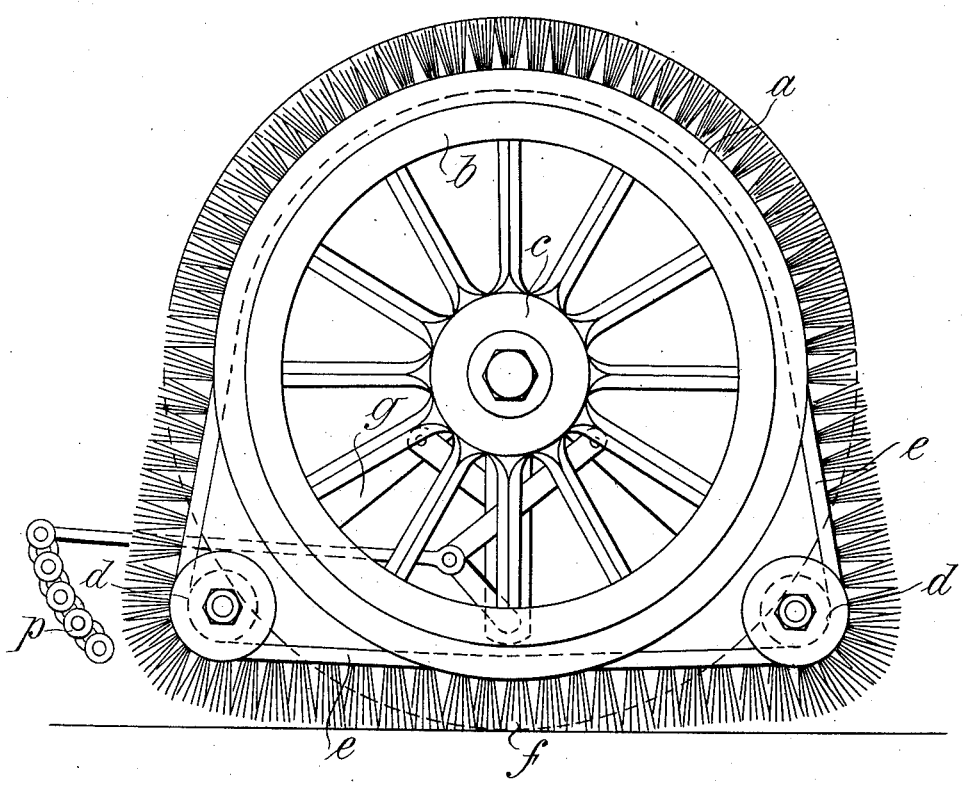

T. R. WIDMAN.
MUD GUARD FOR ROAD VEHICLES.
APPLICATION FILED SEPT. 22, 1913.

1,095,053.

Patented Apr. 28, 1914.
2 SHEETS—SHEET 1.

Witnesses
Floyd P. Cornwall
W. A. Williams

Inventor
T. R. Widman
By  [signature]  Atty.

T. R. WIDMAN.
MUD GUARD FOR ROAD VEHICLES.
APPLICATION FILED SEPT. 22, 1913.

1,095,053.

Patented Apr. 28, 1914.

2 SHEETS—SHEET 2.

Witnesses

Inventor
T. R. Widman
By [signature] Atty.

UNITED STATES PATENT OFFICE.

THEODOR ROBERT WIDMAN, OF EAST TWICKENHAM, ENGLAND.

MUD-GUARD FOR ROAD-VEHICLES.

1,095,053.  Specification of Letters Patent.  Patented Apr. 28, 1914.

Application filed September 22, 1913. Serial No. 791,177.

*To all whom it may concern:*

Be it known that I, THEODOR ROBERT WIDMAN, a subject of His Majesty the King of England, residing at East Twickenham, in the county of Middlesex, Kingdom of England, have invented certain new and useful Improvements in and Connected with Mud-Guards for Motor and other Road-Vehicles, of which the following is a specification.

This invention relates to guards for protecting pedestrians and property from mud-splashes from the wheels of motor and other road vehicles.

The object of the invention is to provide a mud-guard device of simplified construction designed to be supported by the wheel and the body of the vehicle and to extend into close proximity to, or to touch, the ground and thus catch side splashes of mud and water from the wheel.

According to the invention a suitable frame or trough is supported upon or suspended from the wheel hub or rim or other convenient part of the vehicle wheel and a frame attached to the axle or body of the vehicle carries a number of pulleys, wheels or other rollers around which i. e. the trough and the said rollers an endless belt, chain or the like is adapted to travel preferably in the same direction and at the same speed as the vehicle wheel or may rotate with same. The frame may be of triangular shape with the pulleys, wheels or rollers rotatably mounted at its outer corners or angles. A broad endless splash band or brush is secured to and adapted to move with the belt, chain or the like, and in such manner that the plane of its flat face is parallel with the plane of the vehicle wheel, and its lower or outer edge moves at a very short distance from or touches the ground.

The belt, and the splash band or brush secured thereto are driven with the vehicle wheel or may be independently driven by means of a friction wheel or roller interposed between the tire, tread or rim of the vehicle wheel and one of the pulleys, wheels or rollers supporting said belt and band. If desired, the driving belt and splash band may be operated by means of a belt or chain running over pulleys or sprocket wheels secured to one of the supporting pulleys, wheels or rollers and to the axle of the vehicle wheel, or by means of a large toothed wheel mounted on the vehicle wheel or its axle and adapted to mesh with a toothed pinion secured to one of the supporting pulleys.

The tension of the belt and splash band is such that easy running of the same is obtained, and the band is preferably made of leather or other suitable and flexible material and provided with bristles on its outer periphery.

Means may be provided whereby the driver of the vehicle may raise the supporting pulleys, wheels or rollers so that the ends of the lower portion of the guard will move away from the ground when the device is not required for use.

Suitable means are provided to prevent the driving belt and splash band or brush slipping off the supporting and driving pulleys, wheels or rollers. It will be understood now, by allowing for the splash band to travel over the ground in the same direction as the vehicle wheel, wear and dragging of the band are prevented.

Means are also provided so that the ends of the lower portion of the brush will automatically move away from the ground on striking an obstruction on the road surface.

I will now describe my invention with reference to the accompanying drawings in which:—

Figure 3:
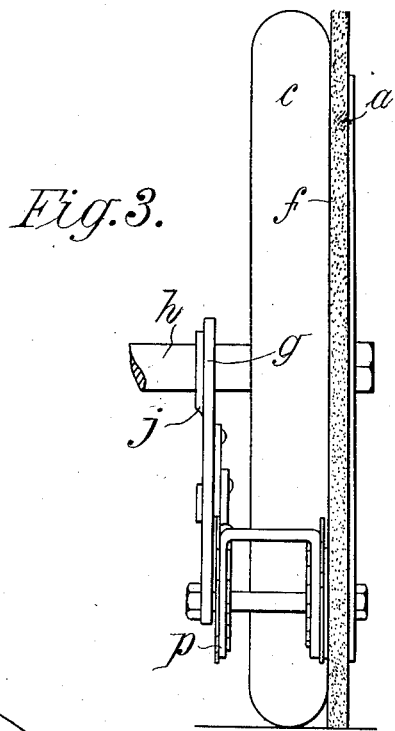
Figure 2:
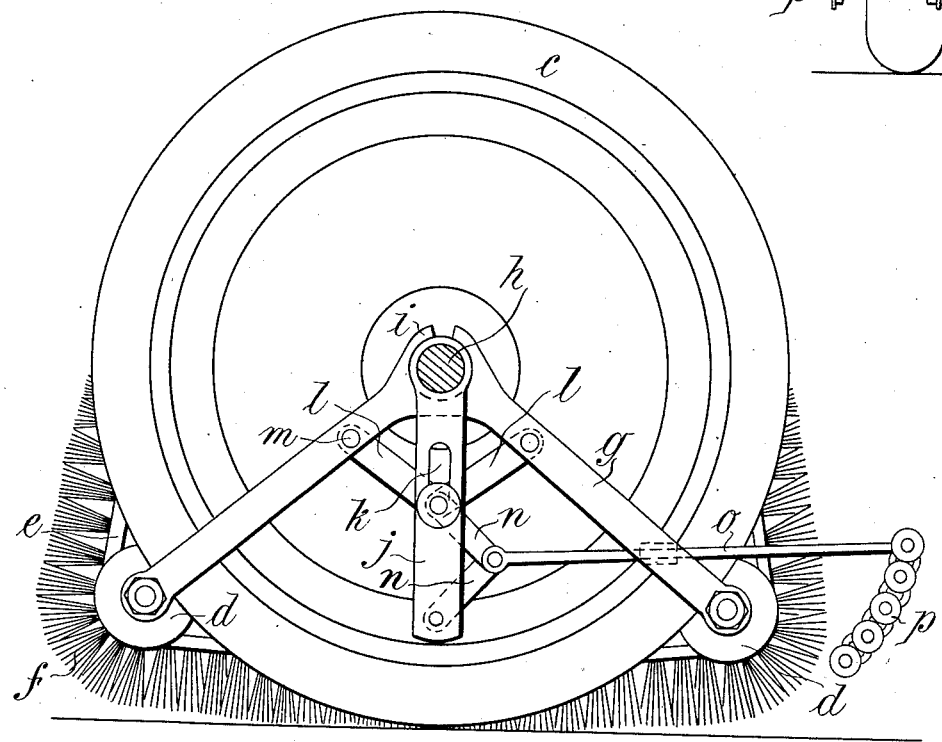

Figure 1 is a side elevation of one form of my invention applied to a motor vehicle wheel; Fig. 2 is a similar view to Fig. 1 viewed from the opposite direction; and Fig. 3 is an end elevation.

As shown a circular rim frame or trough like guide $a$ is detachably connected to or formed in one with the felly, rim $b$ or other convenient part of the vehicle wheel $c$. Within the rim $a$ and over jockey rollers, pulleys or wheels $d$ an endless splash band $e$ of leather or other suitable material is carried, and is preferably provided with bristles $f$ or the like on the outer periphery thereof and may extend beyond or below the tread of the wheel or be coincident therewith. The jockey rollers or wheels $d$ are supported on arms $g$ pivotally attached to the wheel axle $h$ in the form of a rule joint $i$. Adjacent to the said joint and to the axle $a$ depending bar $j$ is fixed provided with a slot $k$ along which are guided in a suitable manner, the ends of toggle levers or arms $l$ pivoted to the said supporting arms $g$ at $m$. To the toggle levers or arms $l$ and to the depending bar $j$ links $n$ are pivoted, and to the outer ends thereof, a sliding bar $o$ is attached suitably guided on one of the arms $g$, and provided at its outer end with a guard or obstruction remover $p$. The guard $p$ is U-shaped and may be provided with rollers as shown, and extends to either side of the wheel $c$.

In operation the endless splash preventing band or brush $e$ travels in one with the vehicle wheel $c$ and normally lies in the trough $a$ except where it is guided outward by the jockey rollers or wheels $d$ so as to present a good length of the splash preventing band to the road surface where the maximum amount of mud splashing occurs thus preventing the mud or water from flying outward on to pedestrians or property.

It will be obvious that should the guard strike an obstruction the rod $o$ will be pushed inward and the jockey rollers $d$ will rise by means of the beforementioned levers, and links and lift the ends of the brush to prevent it from being seriously damaged.

In order that the driver may lift the ends of the brush out of contact with the road surface when not required for use, such for instance, as in fine weather, suitable levers may be provided on the rod $o$ and connected to a suitable part of the vehicle.

What I claim as my invention and desire to secure by Letters Patent of the United States is:—

1. In combination, a vehicle wheel, an endless flexible splash preventing brush or band coöperably related to and moved by the wheel, guide pulleys over which the band passes, said guide pulleys being located adjacent to the outer periphery of the wheel to cause the brush to traverse the surface close to the surface traversed by the wheel, and means for raising the brush from the road surface.

2. In combination, a wheel, a rim on the wheel, a frame adjacent the wheel, means for supporting the frame, guide pulleys mounted on the frame, an endless flexible splash band or brush mounted to travel on said rim and the pulleys, and means for raising the ends of the lower portion of said band away from the road surface.

3. In combination, an axle, a wheel, a circular rim on the side of the wheel, arms pivotally suspended from the axle, guide pulleys mounted on the lower ends of said arms, an endless flexible splash brush mounted to travel over said rim and the pulleys, and means for opening said arms and raising the ends of the lower portion of the brush away from the road surface.

4. In combination, an axle, a circular rim on the wheel, arms pivotally attached to and suspended from the axle, pulleys mounted on the lower ends of said arms, an endless flexible brush mounted to travel over said rim and the pulleys, a bar fixed to and depending from the axle, said bar having a slot, toggle levers pivoted to the arms, a pin guided in said slot and on which the toggle levers are pivoted, a rod slidably mounted on one of the arms, links pivoted to the inner end of said rod and to the depending bar and the pin, and a guard or obstruction remover fitted on the outer end of the rod.

5. In combination, an axle, a wheel, a circular rim on the wheel, arms pivoted to the axle, guide pulleys mounted on the lower ends of said arms, an endless belt mounted to travel over said rim and the pulleys, flexible bristles secured to said belt, a bar fixed to and depending from the axle, said bar having a slot, a pin guided in the slot, toggle levers pivoted to the arms and to the pin, a rod slidably mounted on one of the arms, links pivoted to the inner end of said rod and to the depending bar and the pin, a U-shaped guard or obstruction remover fitted on the outer end of the rod and extending to both sides of the wheel, and rollers mounted on said guard.

6. A mud guard comprising an annular rim rotatable by and with the wheel of a vehicle, a flexible brush passing over and moved by the rim, guides for the flexible brush, one of said guides being located in advance of a vertical line drawn through the center of the rim, another one of said guides being located in rear of a vertical line drawn through the center of the rim, whereby a portion of the flexible brush travels in a horizontal plane, means for supporting the guides, and means for raising the brush from the road surface.

7. In combination, a vehicle wheel, a rim on the wheel, guide pulleys, a flexible brush engaging the rim and the guide pulleys, means for supporting the guide pulleys, and means to be engaged by an obstruction to automatically raise the pulleys and the flexible brush adjacent thereto.

8. In combination, a vehicle wheel, a rim on the wheel, guide pulleys, means including pivoted levers for supporting the guide pulleys, a flexible brush passing around the rim and the guide pulleys, and means including an element located beyond the flexible brush to be engaged by an obstruction to automatically rock the levers to raise the flexible brush from the road surface.

In testimony whereof I have hereunto signed this specification in the presence of two subscribing witnesses.

THEODOR ROBERT WIDMAN.

Witnesses:
 Jos. Articoke,
 Frank Blakey.